United States Patent
Dietz et al.

(10) Patent No.: US 9,148,452 B2
(45) Date of Patent: Sep. 29, 2015

(54) METHOD AND SYSTEM OF CONTROLLING A GATEWAY

(75) Inventors: Ulrich Dietz, Munich (DE); Christian Birle, Munich (DE)

(73) Assignee: VODAFONE HOLDING GMBH, Duesseldorf (DE)

(*) Notice: Subject to any disclaimer, the term of this patent is extended or adjusted under 35 U.S.C. 154(b) by 517 days.

(21) Appl. No.: 13/479,774

(22) Filed: May 24, 2012

(65) Prior Publication Data

US 2013/0003655 A1    Jan. 3, 2013

(30) Foreign Application Priority Data

May 24, 2011    (EP) ..................................... 11167232

(51) Int. Cl.
H04L 12/66         (2006.01)
H04L 29/06         (2006.01)

(52) U.S. Cl.
CPC .......... *H04L 65/1016* (2013.01); *H04L 65/104* (2013.01)

(58) Field of Classification Search
None
See application file for complete search history.

(56) References Cited

U.S. PATENT DOCUMENTS

| 7,539,179 B1 | 5/2009 | Baird et al. |
| 2007/0209061 A1* | 9/2007 | Dekeyzer et al. ................. 726/3 |
| 2007/0232332 A1* | 10/2007 | Holur ............................ 455/461 |

FOREIGN PATENT DOCUMENTS

WO    2008/000287 A1    1/2008

OTHER PUBLICATIONS

3GPP TR 23.888 V1.2.0 3rd Generation Partnership Project;Technical Specification Group Services and System Aspects; System Improvements for Machine-Type Communications; Release 11, Apr. 2011.*

* cited by examiner

*Primary Examiner* — Alex Skripnikov
(74) *Attorney, Agent, or Firm* — Kriegsman & Kriegsman

(57) ABSTRACT

Method of controlling a gateway regarding the communication flow being or to be processed through the gateway. The gateway is assigned to a first communication network that includes a media plane with at least one communication channel to which the gateway is linked, and a control plane, with at least one signaling channel to which a control device is linked. The control device is adapted to controlling the gateway. The method includes that inside a receiver device which is assigned to the first communication network a request for controlling the gateway is received. The request is received from an external third party device. By use of an influence device which, in particular, is assigned to the first communication network, the control device is influenced according to the request and the influenced control device controls the gateway regarding the communication flow being or to be processed through said gateway.

15 Claims, 2 Drawing Sheets

METHOD AND SYSTEM OF CONTROLLING A GATEWAY

Figure 1:
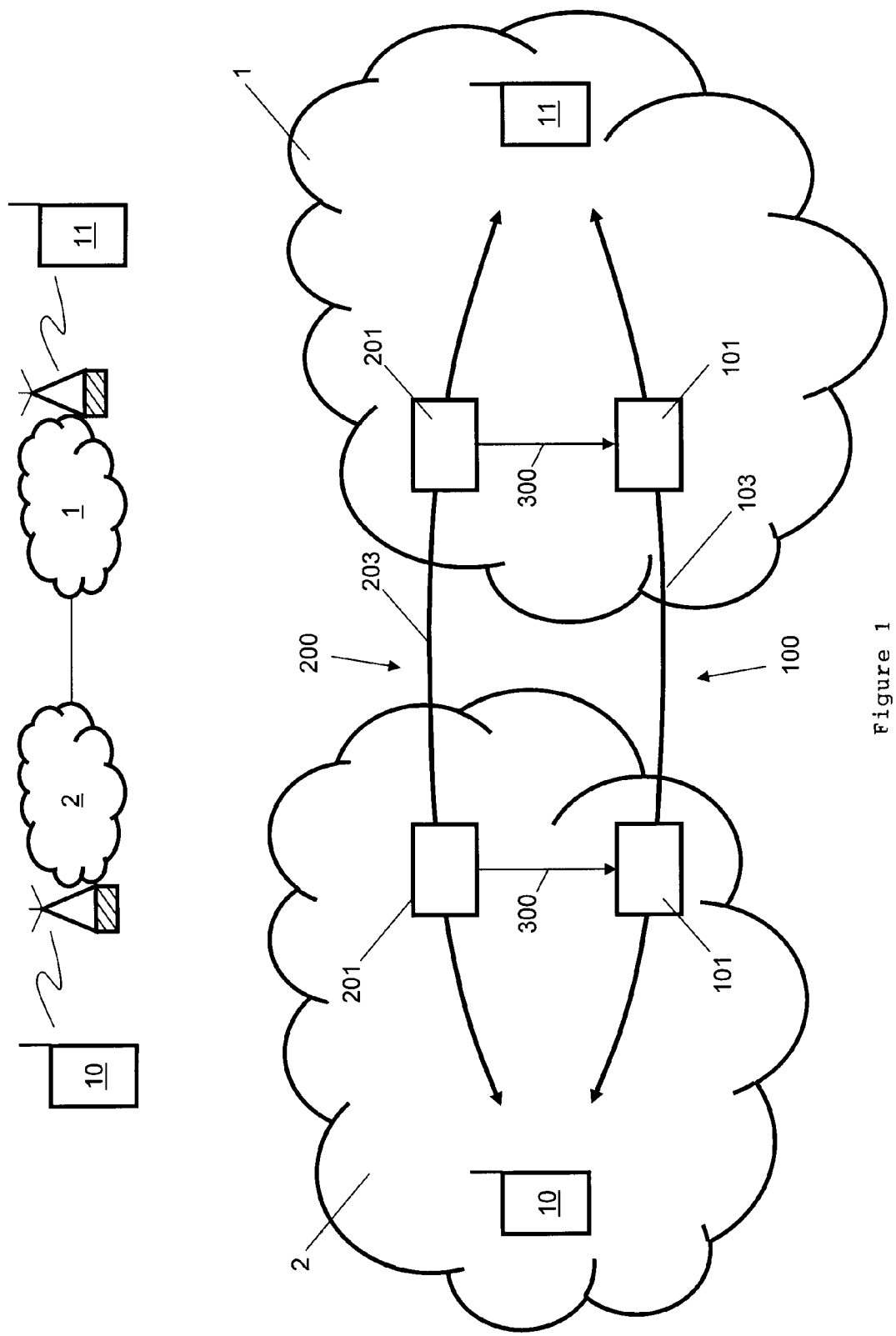

The present invention relates to a method of controlling a gateway according to the preamble of claim 1 and a system of controlling a gateway according to the preamble of claim 8. Furthermore the present invention relates to a method of controlling the extent of communication flow for a communication device communicating through a gateway according to the preamble of claim 13.

Nowadays the control of a gateway, in particular, for controlling the extent of communication flow through a network with a communication device communicating through the gateway is usually controlled by the provider or operator of the gateway. The provider of such gateway can for example be a telecommunication provider and can also be called as mobile network operator (MNO).

Commonly known is a gateway as a network point that acts as an entrance to—another—network or part of a network. So, a gateway can be used for connecting different networks, which can be communication networks. Therefore the gateway has to be controlled and/or adjusted in a way, that the required or allowed information or content passes the gateway as communication flow. The control of the gateway is usually done by the provider or operator of the gateway.

If a third party, which can be an original equipment manufacturer (OEM) for example, which is involved in the communication flow and wants to influence or to control the gateway, there is no possibility for the third party to take influence or control the gateway from the outside, for example the extent of communication flow for a communication device communicating through a gateway.

It is the object of the present invention to provide a method and a system of controlling a gateway regarding the communication flow through the gateway which allows an external third party taking influence on controlling the gateway.

In accordance with the present invention, this object is solved by the method with the features according to independent claim 1 as well as by the system with the features according to independent claim 8, and by the method with the features according to independent claim 13. Additional features and details of the present invention become apparent from the dependent claims, from the description and from the drawings.

Features and details described in connection with the method according to the first aspect of the invention are, of course, also valid in connection with the system according to the second aspect of the invention, and vice versa. Features and details described in connection with the method according to the first, and with the system according to the second aspect of the invention are, of course, also valid in connection with the method according to the third aspect of the invention, and vice versa. Thus, in respect of the disclosure of one of the aspects of the present invention, full reference is always made reciprocally to the disclosure of each other aspect of the present invention.

According to a first aspect of the present invention the object is solved by a method of controlling a gateway regarding the communication flow being or to be processed through said gateway, in particular in relevance to boundaries set. The gateway is assigned to a first communication network, a mobile radio network for example. The first communication network comprises a media plane with at least one communication channel to which the gateway is linked, and a control plane, with at least one signaling channel to which a control device, an IP Multimedia Subsystem (IMS) for example, is linked, said control device being adapted to controlling the gateway. The method is characterized by the following steps:

- inside a receiver device which is assigned to the first communication network a request for controlling the gateway is received, said request is received from an external third party device,
- by use of an influence device which, in particular, is assigned to the first communication network, the control device is influenced according to the request,
- the influenced control device controls the gateway regarding the communication flow which is or can be processed through said gateway.

By use of the abovementioned method, it is possible to control a gateway by consideration of a third party. For example, a third party can inform a provider or operator of the gateway about additional information or can transmit requests or wishes. These information, requests or wishes can for example be forwarded to the third party by a customer. The operator or provider of the gateway can also be a mobile network operator (MNO).

By considering this information, requests or wishes the provider of the gateway can control, modify or adjust the gateway in a way that communication flow and/or the extent of the communication flow to the third party or to the customer is modified. This means, that for example additional services or applications can be provided for a third party or an additional customer or communication participant. In such a case, the provider keeps the administration of the gateway. In addition, the billing of selected services, features or applications, which can be for example additionally selected, can be done by the provider, too.

The present invention provides first of all a method of controlling a gateway. Controlling is particularly understood in a way, that parameters or settings, which are necessary to describe something, are modified according to a request. According to the invention, a gateway should be controlled. So, by controlling a gateway, the parameters or the settings, which describe and/or define the functionality of the gateway are changed or modified according to a request. Before the request and the change or modification of settings or parameters, the extent of transmittable information is limited. Afterwards, the extent of transmittable information is modified in a way that for example information which could not be transmitted through said gateway before, can be transmitted after the modification. The present invention is not limited to an increasing extent of transmittable information or content. It is also possible, that the extent of transmittable information or content can be reduced or restricted. Preferably, the extent of transmittable information or content is increased.

As already mentioned above the communication flow through a gateway can be controlled by controlling the gateway. This means for example, that the gateway is open for one type of information but closed for another type of information. If the gateway is open, the information can be transmitted through the gateway, if the gateway is closed the information cannot be transmitted through the gateway.

A gateway is a commonly known component in telecommunications. In particular, the term "gateway" means in a communications network, a network node equipped for interfacing with another network that may use different protocols. Thereby, a gateway may for example contain devices such as protocol translators, impedance matching devices, rate converters, fault isolators, or signal translators as necessary to provide system interoperability. It can also require the establishment of mutually acceptable administrative procedures between both networks. A gateway, which can also be called a protocol converter, can operate at network layer and above.

Typically, a gateway may convert one protocol stack into another. The present invention is not limited to special types of gateways. For example, a gateway enables the transition and/or exchange of data, signals and the like from a first communication network to a second communication network, and in particular vice versa. A gateway can also enable the transition and/or exchange of data, signals and the like between network segments, between parts of a network and the like. In particular a gateway controls the extent of communication flow to and from q communication device. Therefore the gateway may act as a kind of valve that controls the extent of communication flow.

In particular, the communication flow is the addition of all information. Preferably, the communication flow covers all information transmitted through the gateway.

The communication is processed or can be processed through the gateway. This means for example, that the gateway controls the extent of communication flows, that passes through the gateway. Processing can be understood in a way, that all required tasks for transmitting the information as communication flow through the gateway are performed.

The gateway is assigned to a first communication network. A communication network can be understood as a telecommunications network for example.

A telecommunications network is preferably a collection of terminals, links and nodes which are connected together to enable communication between users of the terminals. Communication networks may use circuit switching or packet switching. A telecommunication network can also be a circuit switched network. Each terminal in the communications network has a unique address so that messages can be routed to the correct recipients and connections can be established.

The present invention comprises two different communication networks, a first and a second communication network. The present invention is not limited to specific types of communication networks. In particular the first communication network is a mobile radio network and the second communication network is a public data network or a packet data network. The second communication network can be the Internet for example. It does not matter where the services reside as long as one gateway is passed on the way.

A mobile radio network can be a communication network where conventional mobile telecommunication can be performed. This can for example be done by a communication device which uses a subscriber identity module or subscriber identification module (SIM) or later versions like the USIM and the ISIM. A SIM is an integrated circuit which securely stores the service-subscriber key used to identify a subscriber on mobile telephony devices. The present invention is not limited to specific types of mobile telephony devices. Examples for mobile telephony devices are smartphones, mobile phones, computers, laptops, notebooks, personal digital assistants, navigational devices, modem or m2m devices.

In particular, the second communication network is a public data network. A public data network is preferably a network established and operated by a telecommunications administration, or a recognized private operating agency, for the specific purpose of providing data transmission services for the public.

The second communication network can also be a packet data network. A packet data network is linked to a packet-switched data network which usually uses packet switched communication. Packet switching is a digital networking communications method that groups all transmitted data, regardless of content, type, or structure, into suitably sized blocks, called packets. Packet switching features delivery of variable-bit-rate data streams over a shared network. When traversing network adapters, switches, routers and other network nodes, packets are buffered and queued, resulting in variable delay and throughput depending on the traffic load in the network.

According to the present invention the gateway is assigned to the first communication network. This means, that the gateway is linked to first communication network. It is not necessary that the gateway is located in the first communication network. Preferably it is located in the first communication network.

Furthermore, the first communication network comprises a media plane with at least one communication channel and a control plane with at least one signaling channel.

A media plane is a common term in the field of telecommunication and simplified spoken a plane for transmitting user data. The present invention is not limited to a specific type of media plane.

A communication channel is a wide spread terminology in telecommunications. In telecommunications and computer networking, a communication channel, or channel generally refers either to a physical transmission medium such as a wire, or to a logical connection over a multiplexed medium such as a radio channel. A channel can be used to convey an information signal, for example a digital bit stream, from one or several senders or transmitters to one or several receivers. By use of a communication channel the communication between at least two communication participants is realised.

A control plane, which is also called a signalling plane, is also a common term in the field of telecommunications. In routing, the control plane is for example the part of the router architecture that is concerned with drawing the network map, or the information in a routing table that defines what to do with incoming packets. Control plane functions, such as participating in routing protocols, run in the architectural control element. In most cases, the routing table contains a list of destination addresses and the outgoing interface(s) associated with them. Control plane logic also can define certain packets to be discarded, as well as preferential treatment of certain packets for which a high quality of service is defined by such mechanisms as differentiated services. The present invention is not limited to specific types of control planes.

The control plane is used to assign QoS parameters to a session and users shall not have access to the control plane.

In contrast to a communication channel/media plane, that only transports the content from one user to the other, a signaling channel is used to transmit signalling information between affected entities. It may be possible that the signalling channel ends at the edge of one network as the second network does not support the kind of control channel. In this case, only one participant is connected to a signalling infrastructure. The involved gateway(s) transcode(s) in that case.

According to the present invention, the first communication network—the MNO for example—comprises a media plane with at least one communication channel to which the gateway is linked, and a control plane, with at least one signaling channel to which a control device, an IP Multimedia Subsystem (IMS) for example, is linked. The control device is adapted to controlling the gateway. The control device is located inside the communication network and cannot be accessed from outside the network. Therefore the control device can be influenced by the operator of the network, the MNO for example, only. The present invention is not limited to specific types of control devices. A control device can be any kind of control system as well.

In the following the control device is described as an IMS. However the present invention is not limited to this specific type of control devices.

The IP Multimedia Subsystem (IMS) is an architectural framework for managing, controlling and delivering Internet Protocol (IP) multimedia services.

According to the present invention inside a receiver device which is assigned to the first communication network a request for controlling the gateway is received. This request is received from an external third party.

A receiver device is a device for receiving information. According to the present invention the information is preferably a request or request and response pattern from an external third party. The request transmitted to the third party can for example be transmitted from an additional user equipment (UE) or an additional communication participant.

By receiving a request for controlling the gateway, the receiving device receives the information to change or modify the gateway. By changing or modifying the gateway, as mentioned above, the parameters or settings of the gateway are preferably changed or modified.

The request for controlling the gateway contains preferably all required information about what is requested or required. The present invention is not limited to specific types of requests.

The external third party is a party which is not located in nor directly linked to the first communication network. "External" is understood in a way that the external third party is not directly linked or connected with the gateway or the operator or provider of the gateway. This means that the external third party is not part or does not belong to the operator of the first communication network, the MNO for example.

The gateway is usually controlled by an operator or provider and an external third party has no possibility to influence the settings or parameters of the gateway.

According to the present invention the external third party can now send a request for changing the settings or parameters of the gateway.

After the request for controlling the gateway is received by the receiver device, the IMS is influenced by an influence device.

An influence device is a device for influencing the IMS. The influence device can be understood that it considers and maybe "analyses" the request for controlling the gateway and, according to the request, the IMS is influenced.

For the receiver device as well as for the influence device it is not necessary, that both devices are located together. It is only necessary, that both devices can communicate with each other in a way that an information transfer is possible.

After influencing the IMS by the influence device the gateway is controlled by the IMS regarding the communication flow processed through the gateway.

Preferably, the gateway comprises an interface to at least one communication device and via the control of the gateway, the communication flow of the communication device which is or can be processed through said gateway is controlled.

The at least one communication device can for example be assigned to the first communication network.

An interface is particularly a tool and a concept that refers to a point of interaction between components, and is applicable at the level of both hardware and software. This usually allows a component, whether a piece of hardware such as a graphics card or a piece of software such as an internet browser, to function independently while using interfaces to communicate with other components via an input/output system and an associated protocol.

Via an interface of the gateway to at least communication device, information from the communication device can be transmitted or processed through said gateway.

The communication device is in particular assigned to the first communication network.

The present invention is not limited to specific types of communication devices. A communication device can be a mobile telephony device. Examples for mobile telephony devices are mobile phones, computers, laptops, notebooks, personal digital assistants.

In a preferred embodiment of the invention, the extent of communication flow for the communication device communicating through said gateway is controlled.

Via the communication device a communication through the gateway is possible. By controlling the gateway, the extent of communication flow can be controlled. As "extent" it is understood, as already mentioned above, that the content or the amount of content of the information which can be transmitted through the gateway can be modified or changed. By controlling the gateway it can be possible to enable a higher transmission rate of information or to enable the transmission of information or content which was not transmittable before. Examples for transmittable information and content will be given in the description of the figures and so full reference is made to those examples.

In addition, the receiver device and the influence device are preferably parts of a machine-to-machine (M2M) platform assigned to the first communication network. Inside the M2M platform, the request for controlling the gateway is received, and by use of the M2M platform the IMS is influenced according to the request.

Machine-to-machine (M2M) refers in particular to technologies that allow both wireless and wired systems to communicate with other devices of the same ability. M2M usually uses a device to capture an event which is relayed through a network, for example a wireless, wired or hybrid network, to an application, for example a software program, that translates the captured event into meaningful information.

As parts of the M2M platform the receiver device and the influence device can built the M2M platform. It is also possible that the M2M platform consists of more components than the receiver device and the influence device. The present invention is not limited to certain types of M2M platforms.

Preferably, a verification device is assigned to the first communication network. The verification device verifies the request of the external third party device for controlling the gateway which has been received by the receiver device and the IMS is influenced by use of the influence device after a positive verification of the request.

It is possible that the request is verified after being received by the receiver device and before influencing the IMS by the influence device. By this verification, which is performed by a verification device, the request can for example be checked on/for validity. The request for controlling the gateway can for example comprise invalid information. By verifying the request by the verification device such invalid information can be separated.

According to a preferred embodiment of the present invention, the IMS is influenced by writing commands for controlling the gateway into the Home Subscriber Server (HSS) and/or the Policy Decision Function (PDF) as the essential elements in the IMS.

A Home Subscriber Server (HSS) which can also be called a User Profile Server Function (UPSF) is particularly a master user database that supports the IMS network entities that actually handle calls and data sessions. It usually contains the subscription-related information as subscriber profiles, performs authentication and authorization of the user, and can provide information about the subscriber's location and IP information. It is similar to the GSM Home Location Register (HLR) and Authentication Centre (AuC).

The Policy Decision Function (PDF) is also a well known term in telecommunications. It is a component in the IP Multimedia Subsystem (IMS) and controls traffic entering the packet-switched network by allocating or denying IP bearer resources.

With the evolution to LTE the network has been simplified. The gateways have been renamed to S-GW (Serving Gateway aka SGSN) and P-GW (Packet Data Network Gateway aka GGSN) and the parts of the PDF are now part of the PCRF (Policy and Charging Rules Function).

Preferably, it is also possible that information concerning the gateway control is made available for a billing process or a billing engine for generating billing information, said billing process or billing engine is preferably assigned to the first communication network.

When a third party wants to control a gateway and sends a request for controlling the gateway to the receiver device and the gateway is controlled according the request, the provider or operator of the gateway maybe wants to be paid for this service. In such case, special information concerning the actions of controlling the gateway are required for ensuring a valid bill procedure or making a valid and/or correct bill possible. Therefore, it is necessary to make information concerning the gateway control available. The information is provided for a billing process or a billing engine, which can perform the billing process. The billing engine can for example be part of the IMS.

According to a second aspect the present invention relates to a system for controlling a gateway regarding the communication flow being or to be processed through said gateway. The system comprises a gateway being linked to a communication channel of a media plane of the first communication network, a mobile radio network for example. The system further comprises a control device, an IP Multimedia Subsystem (IMS) for example, said control device being adapted to controlling the gateway and said control device is linked to a signaling channel of a control plane of the first communication network. The system further comprises a receiver device for receiving a request from an external third party device for controlling the gateway, an influence device for influencing the control device according to the request, and means for controlling the gateway regarding the communication flow being or to be processed through said gateway on the basis of the influenced control device.

As already mentioned above, controlling is particularly understood in a way, that parameters or settings, which are necessary to describe something, are modified according to a request. According to the invention, a gateway should be controlled. So, by controlling a gateway, the parameters or the settings, which describe the functionality of the gateway are changed or modified according to a request received by a third party. Before, the request and the change or modification of settings or parameters, the extent of transmittable information is limited. Afterwards, the extent of transmittable information is modified in a way that for example information which could not be transmitted through said gateway before, can be transmitted after the modification. The present invention is not limited to an increasing extent of transmittable information or content. It is also possible, that the extent of transmittable information or content can be reduced. Preferably, the extent of transmittable information or content is increased or adjusted according to the parameters set.

The communication flow through a gateway can be controlled by controlling the gateway. This means for example, that the gateway is open for one type of information but closed or limited for another type of information. If the gateway is open, the information can be transmitted through the gateway, if the gateway is closed the information cannot be transmitted through the gateway.

The gateway, the first and the second communication network can be arranged and can function in a way as mentioned above.

According to the present invention, the first communication network comprises a media plane, a gateway, a control plane and a controlling device, an IMS for example, as mentioned above.

According to the present invention inside a receiver device which is assigned to the first communication network a request for controlling the gateway is received. This request is received from an external third party. With regard to the receiver device and the external third party, full reference is made to the description with regard to the first aspect of the present invention.

After the request for controlling the gateway is received by the receiver device, the IMS is influenced by an influence device. With regard to the influence device, full reference is made to the description with regard to the first aspect of the present invention.

After influencing the IMS by the influence device the gateway is controlled by the IMS regarding the communication flow processed through the gateway, by use of those means of controlling the gateway.

Preferably the gateway comprises an interface to at least one communication device, is assigned to the first communication network. With regard to the interface and its function, full reference is made to the description with regard to the first aspect of the present invention.

According to another preferred embodiment, the receiver device and the influence device are parts of a machine-to-machine (M2M) platform assigned to the first communication network. With regard to the M2M platform and its function, full reference is made to the description with regard to the first aspect of the present invention.

Preferably, the system comprises a verification device for verifying the request for controlling the gateway which has been received by the receiver device. Said verification device is assigned to the first communication network. Alternatively or in addition the system comprises a billing engine for generating billing information and means for making information concerning the gateway control and actual consumed services available to the billing engine. The billing engine is assigned to the first communication network. With regard to the aforementioned features and their functions, full reference is made to the description with regard to the first aspect of the present invention.

The system preferably comprises means for performing the abovementioned method according the first aspect of the invention.

According to a third aspect the present invention relates to a method of controlling the extent and nature of a communication device communicating through a gateway by controlling and parametrizing the gateway. The gateway is assigned to a first communication network, in particular a mobile radio network, wherein the first communication network comprises a media plane with at least one communication channel to which the gateway is linked, and a control plane, with at least one signaling channel to which a control device, an IP Multimedia Subsystem (IMS) for example is linked, said control device being adapted to controlling the gateway. This includes also the separation within a single network e.g. service and user are located in the same network and communication is funnelled though the gateway.

The method is characterized by the following steps:
a communication flow from said communication device to an external third party device is established through said gateway,
a request for controlling the extent of the communication flow for said communication device is generated by said communication device and/or said external third party device,
the request is transmitted from the external third party device to receiver device which is assigned to the first communication network,
the control of the gateway regarding the communication flow being or to be processed through said gateway is performed by the abovementioned method according to the first aspect of the invention,
based on the controlled gateway, the communication device is enabled to communicate through said gateway according to the requested extent of communication flow.

Via the communication device a communication through the gateway is possible. By controlling the gateway, the extent of communication flow can be controlled. As "extent" it is understood, as already mentioned above, that the content or the amount of content of the information which can be transmitted through the gateway can be modified or changed in terms of QoS, session, time volume etc. By controlling the gateway it can be possible to enable a higher transmission rate of information or to enable the transmission of information or content which was not transmittable before. Examples for transmittable information and content will be given in the description of the figures and so full reference is made to those examples.

In a first step, a communication flow from said communication device to an external third party device is established through the gateway.

In a second step, a request for controlling the extent of the communication flow for said communication device is generated. The request can be generated by said communication device and/or said external third party device.

In a third step, the request is transmitted from the external third party device to receiver device which is assigned to the first communication network.

Then, the control of the gateway regarding the communication flow being or to be processed through said gateway is performed by the abovementioned method according to the first aspect of the invention.

Therefore full reference is made to the above description of the first aspect of the invention.

Finally, once the gateway has been controlled/correctly parametrised, the communication device is enabled to communicate through said gateway according to the requested extent of communication flow.

Preferably, various services and/or applications are or can be selected and/or subscribed for the communication device and based on the selection and/or subscription, the request for controlling the extent of the communication flow for said communication device is generated.

By the method of controlling the extent of the communication flow for a communication device communicating through a gateway by controlling the gateway various services and/or applications can for example be selected. These services and/or applications can particularly be additional services and/or applications, or packets of additional services and/or applications provided by the operator or provider of the gateway, which have to be activated before the first use.

Additional features of the invention according to of the above described aspects of the present invention become apparent from the following example as well. However, the present invention is not limited to this specific embodiment.

At the beginning the gateway can for example be closed for such services and/or applications. This means these services and/or applications are not possible to use. To make it possible to a user of the communication device to use or select the services and/or applications it is necessary to control the gateway, for example by changing or modifying the parameters or settings of the gateway. For the selection and/or subscription of the services and/or applications, these services or applications can be selectable for the user of the communication device but not useable. These services and/or applications become useable for the user of the communication device after the gateway has be controlled accordingly. This control is performed by the operator or provider of the gateway.

Based on the controlled gateway, the communication device is preferably enabled to use the selected and/or subscribed services and/or applications. This means the communication flow of the communication device with regard to those services and/or applications can now be handled through said gateway. In this case the user of the communication device can use these services and/or applications within the set restrictions.

The communication between the two participants or users is particularly performed by using a circuit switched and a packet switched channel. Via the circuit switched channel voice can be transmitted form one participant to another participant. For transmitting or transferring data between the participants, usually a packet switched connection is used.

A gateway, which controls the data or information to be transferred from one participant to another participant can be used. For controlling the gateway, an IP Multimedia Subsystem (IMS) can be used to provide the control plane.

By use of the present invention it is possible to create an open platform for a participant B which allows providing several services and/or applications for participant B. The provision of additional and/or further services can be done in real time or almost real-time. The result is the control of the gateway by for example modification of the parameters and/or setting of the gateway.

For the use of these services a bill can be created for participant B.

Another advantage is that the third party can take influence on control parameters for the control of the gateway. This influence is taken by the third party, by transmitting a request to the M2M platform for example. The M2M platform is controlled by the MNO. However the external third party hasn't had the possibility to directly control the gateway in the past.

For the process of controlling the gateway for participant B, the third party can make a deal with the MNO for a certain rate of data transfer or access to a certain set of services in advance. The MNO provides the required SIM for the communication of participant B. For activating or using the SIM, participant B registers at MNO. After the registration, participant B can pass the gateway in the allowed extent. As mentioned above, participant B may have access to basic services and applications which are selectable and usable via/through a portal. These basic services and applications can be called the basic information A. For example information A can comprise a portal of the external third party as well.

Beyond the basic information, participant B can order additional services and/or application. These services are not available with the basic gateway stetting.

Therefore the settings of the gateway have to be modified. The required modifications and/or the additional services and/or applications are billable and so the MNO creates billing information for billing the third party or the participant B. The bill can be created by use of a billing engine, which can be part of the IMS respective the MNO system.

After participant B has set his order for an additional service and/or application, this order is forwarded to the external third party. The third party transmits the order in form of a request to the MNO, preferably to the M2M platform. This means that the external third party has no direct connection to the IMS.

After receiving the request from the external third party, the MNO can optionally check or analyse the request automatically. If the request is valid, the IMS receives the command to control the gateway according to the request from the MNO. This can be performed in a way, that the required changes in connectivity is available immediately.

After the required connectivity is available the participant B can use the additional services and/or applications.

Regarding payment of the bill it can be possible that instead of the participant B, the third party pays the bill. The present invention is not limited to specific conditions of bill payment.

By the present invention, the third party, which can be for example a vehicle manufacturer, can offer additional services or applications for their vehicles. Therefore the MNO can offer the required communication network.

Additional features of the present invention according to all aspects of the present invention become apparent from the following description as well. One purpose of this invention is to provide multi party and differentiated billing support for machine-to-machine (M2M) and automotive applications that allows flexible and fine grained automotive service proposition overcoming current restrictions.

Main elements of a full system are a differentiated billing and multi party support as an enabler for new vehicle services, service management based on M2M services management platform and test and roll out support, for example the lifetime of a vehicle.

This shall be possible by applying IMS functions and shall result in an M2M provider, vehicle manufacturer and mobile network operator (MNO) friendly way and on a pan-European scale. Modern mobile network components, especially IMS, Subscriber Identity Module (SIM) and core network elements provide the necessary functionalities and enhancements.

One of the main barriers for embedded automotive solutions is the missing, in particular billing and tarriffing, flexibility of OEMs and third parties. If a SIM is embedded by the OEM, the OEM may not be prepared to open the SIM for any user generated traffic and services. And if the user has to bringing along his or her own SIM and/or Smartphone, for example plug-in SIM, the OEMs and third parties may not be able to rely on that connection.

To make vehicle communication and automotive services a mass market phenomenon, it is essential to have the right solutions, tools and products ready for the customers to buy.

As of today and with some generalization these are not available beyond the availability of vertical or silo solutions, SIMs and tariffs. For a future proof and versatile service offer it is necessary to leverage billing and service flexibility, so that customers, for example the OEMs, can set up and run cellular based vehicle telematics services in a well structured and sustainable way as end-to-end services. The OEMs shall be able to manage and control the services for them. The mentioned functionalities can be offered by a MNO who has full access to all network components on a European level.

The present invention defines the enabling framework and functions for such a system. OEMs today tend to either limit the functionality by setting up silo applications to reduce and control cost or to leave it to the customer to provide their own SIMs and tariffs. Both approaches are limiting the business and the take up of a vehicle telematics mass market. The present invention in fact will enable and provide OEMs with more specific and tailored functions to offer automotive value-added services in a cost effective, reliable, ubiquitous and pan-European way.

According to the present invention, a set of network based functions are provided that allow OEMs and M2M providers to set up and run cellular based traffic telematics services in a well structured and sustainable way as end-to-end services. The OEMs and M2M providers shall be able to manage and control the services for them. The before mentioned functionalities can only be offered by a MNO who has the full access to all network components on a European level.

Therefore, three different stages can be distinguished.

Firstly, the simplest version is to route traffic via a dedicated Access Point Name (APN) into the OEM's network. This will give them some control and is already offered and available. These mechanisms are used in M2M and GDSP setups today. This is known and state of the art.

Secondly, what is not used today but worth an initial step, is the use of IMS, parallel packet data protocol (PDP) contexts and ISIM functionalities that will enable Universal Mobile Telecommunications System (UMTS) systems to provide basic the mentioned functions.

Thirdly, the Long Term Evolution (LTE), as the first full internet protocol (IP) based system, will come with the necessary features that allow implementing versatile Quality of Service (QoS) and charging mechanisms as envisioned. Core element here is the ability to set up various Evolved Packet System (EPS) bearers which are similar to UMTS PDP contexts, that can provide the basis for independent QoS and charging attributes and allow to separate traffic and/or packets from each other and so to provide a control point for vehicle communication services.

In particular, one element and trust anchor of the present invention can be the use of a M2M Universal Integrated Circuit Card (UICC) and/or Universal Subscriber Identity Module (USIM) with ISIM functionality that can be embedded to the in-vehicle device in the car. Ideally this UICC and/or USIM is an M2M platform card to allow European-wide roaming and to apply the bulk processes set up for industrial customers. The UICC and/or USIM and/or ISIM presents a trust anchor and starting point for any services provided throughout the lifetime of the vehicle, from preproduction to scraping the vehicle. Based on processes developed for M2M customers, millions of UICC and/or USIM and/or ISIM can be handled easily. To provide the vehicle manufacturers and M2M service provider with the needed functionality, it is necessary to provide mechanisms and procedures for all life cycles a vehicle can be in.

Before the vehicle or more generally a M2M device can be sold it has to be produced and tested. After successful testing the devices are set dormant and prepared to be shipped to the country of sale.

For example, the vehicles are degreased, cleaned and prepared for sales or delivery. When the vehicle has been sold and is about to leave the dealership, the dealer marks the vehicle as sold in the OEMs sales and customer relationship database. This triggers a process that activates all vehicles centric and/or OEM centric services and can be coordinated with the M2M backend systems at the MNO. These vehicle centric services may be eCall, stolen vehicle tracking, customer relation management and the set of eCall, remote diagnosis and remote software updates.

If the customer and/or the first owner opts in for additional value added services, these services are and according to the present invention, accounted to and paid by the customer and/or vehicle owner. This is true for all categories of services expect the vehicle centric and/or OEM centric services. For instances a third party could offer any kind of package comprising of product and/or service combined with the necessary communication so that the user subscribes to the service and both vehicle manufacturer and user are relieved for any communication cost as they are included in the price of the goods. The communication services and subscriptions can be charged according all metrics, like volume, time, session, event, flat.

If the user once stops using the services, the OEM and/or vehicle centric services will be still available. And in case the user sells the car and it is parked at the dealership for some time, all customer services are terminated except the OEM/vehicle centric services. Once the car is sold again, the service provision process will be reactivated and the new owner is able to subscribe to any services again. At the end of lifetime, all services will be terminated, the SIM deactivated and purged from the systems. This will be handled according the 'end of lifetime' patent that has been filed recently.

Even if the underlying mechanisms are technology agnostic, essential element for the present invention is the technology and the integration in and the extension of the M2M platform. The M2M platform was in particular developed as a pan-European data only platform and was initially used to support the roll out of navigation devices. As a data only platform the system lacks some essential features.

Quite general, IMS allows to control a variety of parameters in a given session to a dedicated UE for a given SIM. IMS is able to assign and control a variety of QoS parameters like volume, speed, latency, codecs, to control the source and destination of the media and to start or stop the media flow and additionally authorise roaming to enforce the MNO's policy. Literally the IMS allows a fine-grained control of every aspect if used correctly.

For this, the UEs (the cars or their In-Vehicle Systems) negotiate the various quality parameters prior to setting-up a call or connection, in an end-to-end relation. For the access to an application server or in general to the network like internet, predefined QoS parameter sets are used that are negotiated during contract negotiation or are defined by the postpaid and prepaid product bought for example QoS differentiation according to the price of the product. This all is kept internal in the MNO systems and nobody from the outside has access to it. In the present invention this shall be opened to third parties.

Most of the relevant information, that make up and define an IMS contract, is stored in two places: the home subscriber server (HSS) and in a box called the policy decision function (PDF).

The HSS is the HLR successor whereas the PDF is a new entity and a part in a framework for policy-based admission control and connected to and required by the Gateway GPRS Support Node (GGSN) gateway. These boxes shall be, in particular partly, opened for, for example controlled, influence by external partners, presumably the OEMs.

This information is required to be able to influence the Policy Enforcement Point (PEP) that is a function of the GGSN, in particular the gateway, that essentially controls the media and signalling flow and hence the services and their quality in the car.

This process of linking the PDF via the proxy call server control function (P-CSCF) to the policy enforcement function (PEF) and/or GGSN is called Service Based Local Policy (SBLP) and implements a regime that allows this fine grained control of the media flow on the "line", the media plane.

In the present invention the system is opened to the OEMs in a controlled way, that the OEMs are able to i) get, in particular some, influence on the normally MNO-internal IMS system to implement their policy, ii) get a way the register service providers as their external partners and iii) provide them with the ability to provide and/or integrate billing and charging methods.

Regarding i): Existing M2M platforms allow third parties and/or OEMs access to the system and to manage the SIMs allocated to them. For that, the third party gets access rights to subparts of the MNOs M2M-platform, that itself is connected to the network elements and the various entities in the network.

For an IMS based system, this has to be improved so that a much more fine grained control is possible. At the same time, the MNO must be able to define the boundaries in between that the OEM is able to define and control their services. The MNO has to retain some kind of supervision and the ability to set the rules.

Every aspect the OEM sets is mirrored and linked to the IMS system, that then exactly executes these settings.

To not confuse the OEMs with internal IMS procedures and system calls, the M2M platform needs to abstract and translate the OEM's business logic and rules into MNO IMS speak. And the M2M platform needs to be able to support multiple OEMs—MNOs shall be able to serve a variety of OEMs in parallel and independent form each other without any interference or side effects.

Moreover the MNO shall make every aspect available to the OEM, as far as it makes sense and is feasible. This includes for example start or stop, destinations and QoS. Input from the MNO side is the basic information about SIMs delivered to or available to the OEM, geographical coded roaming information, tariff options, etc. The OEM provides lists of minimal services available to the cars, for example day of start, promotion with maybe free access for some time and end of life when the car is scraped.

Every service booked is delivered via the interface with the necessary parameters (start, stop, destination address, max. volume, etc.) This is then written to the affected IMS elements. Therefore the MNO logic translates all OEM requests into IMS commands and IMS responses are translated in OEM responses. This effectively hides the internal setup and operation. Moreover the M2M platform distributes the OEM requests to the affected IMS components as HSS, PDF, and billing.

Regarding ii): Part of the overall system are mechanisms that are necessary to register and accept content providers to the system.

Regarding iii): To make the system work in total, the MNOs IMS system shall provide the necessary billing information that is used to pay the service. IMS provides the necessary billing information and it needs a dedicated but not in this invention handled process to authorise and bill the services. Not discussed any further.

Up to eleven PDP contexts can be used or all traffic can be assigned to the secondary PDP context alone and shall be supported. In the end, the OEMs shall be able to 'influence' and manage their part of the system.

By use of the present invention, which will be described by an example further below, it is possible to create an open platform for participant B which allows providing several services and/or applications for participant B. The provision of additional and/or further services can be done in real time or almost real-time. The result is the control of the gateway by for example modification of the parameters and/or setting of the gateway.

For the use of these services a bill can be created for a participant B.

Another advantage is that the third party can take influence on control parameters for the control of the gateway. This influence is taken by the third party, by transmitting a request to the M2M platform. The M2M platform is controlled by the MNO.

For the process of controlling the gateway for B, the third party makes a deal with the MNO for a certain rate of data transfer. The MNO provides the required SIM for the communication of participant B. For activating or using the SIM, participant B or the OEM in advance registers with the MNO. After the registration, participant B can pass the gateway. As mentioned above, participant B has access to selected services and applications which are selectable via/through a portal. These selected services and applications can be called the basic information A.

Beyond the basic information and/or basic functionalities, participant B can order additional services and application. These services are not available with the basic gateway stetting. Therefore the settings of the gateway have to be modified. The required modifications are payable and so the MNO creates billing information for billing the required modifications to the third party or the participant B. The bill can be created by use of a billing engine, which can be part of the IMS.

For the use of the ordered additional services and/or applications it can be necessary, that bill is paid in advance. This can for example be done by pre-paid.

After participant B set its order for an additional service or application, this order is forwarded to the third party. The third party transmits the request further to the MNO, preferably to the M2M platform. This means that the third party has not direct connection to the IMS.

After receiving the request from the third party, the MNO checks or analyses the request. If the request is invalid, the gateway will not be modified or controlled. To inform the participant, it can be possible to send a message to the participant. If the request is valid, the IMS receives the command to control the gateway according to the request. This can be performed in a way, that the required connectivity is available immediately.

After the required connectivity is available the participant B can use the additional services and/or applications.

Regarding paying the bill it can be possible that instead of the participant B, the third party pays the bill. The present invention is not limited to specific conditions of bill payment.

By the present invention, the third party, which can be for example a vehicle manufacturer, can offer optional and/or additional services and/or applications and/or information on his vehicles. Therefore the MNO can provide and/or offer the required communication network.

Figure 2:
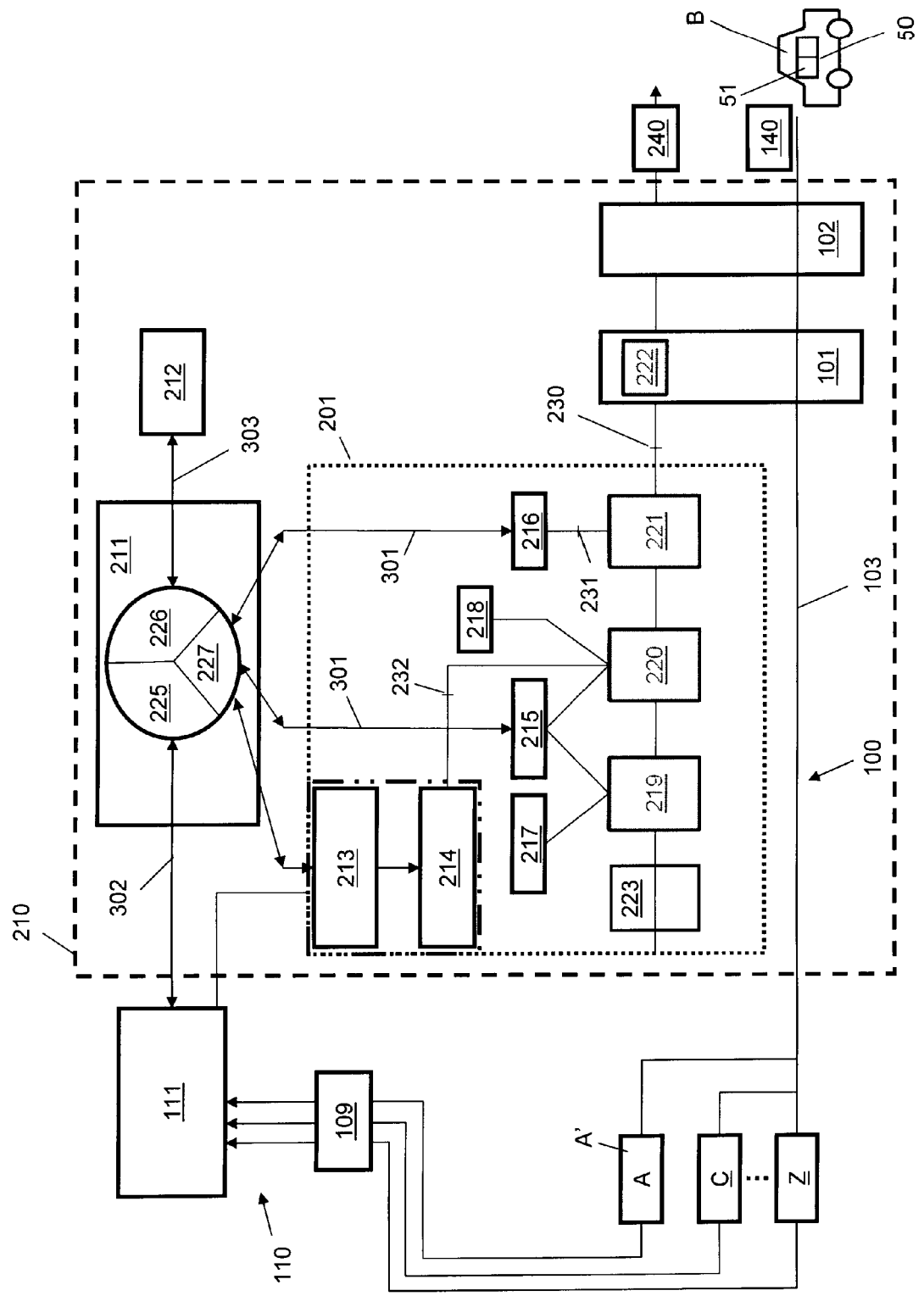

For a better understanding of the present invention, a preferred embodiment of the present invention will now be described by way of an example with reference to the description and the accompanying drawings, in which FIG. 1 schematically depicts how the communication between two participants is generally performed, and FIG. 2 is a schematic view of the embodiment of the present invention.

FIG. 1 schematically depicts how the communication between two participants is generally performed as it is known today.

The communication is performed between participants 10 and 11, whereas the two participants are located in different communication networks 1 and 2.

As the upper portion of FIG. 1 shows, a communication between participants 10 and 11 is performed such, that participant 10 communicates through network 2 to which he is registered and through network 1 with participant 11. Participant 11 is registered to network 1. Both networks 1, 2 are linked to one another. This can be achieved by use of gateways for example, which becomes apparent form the lower portion of FIG. 1.

As evident from the lower portion of FIG. 1, both networks 1, 2 comprise a media plane 100 and a control plane 200, respectively. Media plane 100 comprises at least one communication channel 103 and control plane 200 comprises at least one signalling channel 203. For the communication shown in FIG. 1, the communication between participant 10 and 11 is performed by the use of control plane 200 and media plane 100.

At least the network 1 needs that kind of IMS support as the network the services are hosted and the OEM is located at need not necessarily an own IMS system. Without an IMS to connect to the network 1 needs IMS for internal control only and the IMS session as well as the various PDP contexts terminate in network 1.

Via the control plane 200 signalling information can be transferred or transmitted from participant 10 to 11 and/or vice versa. Using the media plane 100, user data are transmitted or transferred between participant 10 or 11.

In order to allow the aforementioned communication at least one network 1 or 2, in particular both networks 1 and 2, comprise a gateway 101. The gateway 101 is linked to communication channel 103.

In order to control the respective gateway 101, at least one network 1 or 2, in particular both networks 1 and 2, comprise a control device in 201 form of an IP Multimedia Subsystem (IMS). The IMS 201 is linked to signaling channel 203. The controlling procedure is represented by arrow 300.

If data are transferred during a communication between participants 10 and 11, those data are transferred via communication channel 103 of media plane 100. The gateway or gateways 101 control the data or information to be transferred from participant 10 to participant 11. For controlling the gateway 101, IP Multimedia Subsystem (IMS) 201 is provided at or in the signalling channel 203 of control plane 200. In the IMS 201 the required information or data for controlling the gateway regarding the information or data to be transferred or transmitted between both participants 10, 11 for a communication are generated and transmitted from the IMS 201 to the gateway 101 via controlling procedure 300. By the controlling procedure 300 the gateway 101 can be adjusted or set in a way, that the data or information to be transferred via a communication channel 103 can be pass the gateway 101.

MNO 1 and 2 control their own IMS that talk to each other.

Referring to FIG. 2, a preferred embodiment of the present invention is shown. This embodiment is based on a network architecture as shown in FIG. 1. At first, the main components with their main functionality shown in FIG. 2 will be described. In the following the present invention will be described by describing an example considering the main components of FIG. 2.

In FIG. 2 generally three parties can be distinguished. These parties are a communication participant B, an original equipment manufacturer (OEM) 110 and a mobile network operator (MNO) 210.

The communication participant B, who is called participant B in the following, is for example located to a vehicle or car, which provides a communication device 50. The communication device 50 can be an on-board computer for example. In this communication device 50 a conventional Subscriber Identity Module (SIM) 51 is inserted for enabling the communication through the communication device 50. A SIM 51 is for example known in vehicles for enabling eCall, which is a known pan-European project.

By use of the communication device 50 participant B can for example communicate with another communication participant. This second communication participant can for example be a service centre 111 of the OEM 110 of the vehicle of participant B.

The communication between participant B and the OEM service centre 111 can be realised by use of a gateway 101 and a communication channel 103 as part of a media plane 100. The gateway 101 and the communication channel 103, which is part of media plane 100, are parts of the communication network provided by the MNO 210. While communicating, participant B transfers information and/or data and/or signals from the communication device 50 to the OEM 110 or the OEM service centre 111 using the abovementioned components.

In addition to the communication between participant B and the OEM 110, a communication between the OEM 110, in particular the OEM service centre 111, and the MNO 210 is possible, too. Therefore the OEM 110 transfers or transmits information and/or data and/or signals to the MNO 210 via the OEM service centre 111. To be more precise, the OEM 110 can transmit information and/or data and/or signals to the communication network, which is provided by the MNO 210. Regarding the MNO 210, the OEM 110 is not part of the network, so the OEM 110 can rather be interpreted as an external third party to the MNO 210.

As already mentioned above, the MNO 210 provides the network for the communication between participant B and the OEM 110 and the communication is performed by transmitting and/or transferring information through the gateway 101. This gateway 101 has to be controlled and/or adjusted by the MNO 210 for controlling the information and/or data and/or signals which shall pass the gateway 101.

For doing so, the MNO 210 provides further components, which will be described in the following. The MNO 210 provides for example a machine-to-machine platform (M2M) 211 and a MNO policy and business framework 212. The M2M 211 comprises a receiver device 225, a verification device 226 and an influence device 227.

By the receiver device 225, the MNO 210 can receive information and/or data and/or signals, which will be described as data in the following, from an external third party, like the OEM 110 in particular from the OEM service centre 111. The verification device 226 is used by MNO 210, to verify if the received data by the receiver device 226 is valid. Therefore the received data can be compared with corresponding rules or second data, which are stored in the MNO policy and business framework 212.

After receiving data from the OEM 110 and maybe a verification, the influence device 227 can influence another component of the communication network, according the received and verified data. How this can be performed will be described in detail in the following. A component, which can be influenced by the influence device 227 can be for example an IP Multimedia Subsystem (IMS) 201, which is another component of the network of the MNO 210 and will also be described in detail in the following.

Beside the M2M platform 211, the MNO policy and business framework 212 and the IMS 201, the network of the MNO 210 comprises further components for example a Serving GPRS Support Node (SGSN) 102 and the gateway 101, which is also called Gateway GPRS Support Node (GGSN) 101. The gateway 101 further comprises a Policy Enforcement Function (PEF) 222.

Changes and simplifications have been made to LTE while preserving the general behaviour and function.

As already mentioned above, the communication between participant B and the OEM 110 is possible by use of the gateway 101, provided by the MNO 210. To make the communication between participant B and the OEM 110 through the gateway 101 possible, the gateway 101 has to be set or influenced or controlled or adjusted by the MNO 210. This is usually done by the IMS 201 which can be influenced by the influence device 227.

Therefore, the IMS 201 comprises an Interrogating Call Server Control Function (I-CSF) 219, a Serving Call Server Control Function (S-CSCF) 220, a Proxy Call Server Control Function (P-CSCF) 221 and for example other IMS networks 223. The IMS 201 further comprises a Service Control Function (SCF) 217, a Home Subscriber Server (HSS) 215, a Policy Decision Function (PDF) 216 and an Application Server (AS) 218. For a billing procedure 214, the IMS 201 further comprises a billing engine 213.

The communication mentioned above is performed from a first communication network 1 to a second communication network 2 or with other entities in network 1. The gateway 101 enables the transition of the first communication network 1, which is a mobile radio network, to a second communication network 2, which is a public data network or a packet data network. The gateway 101 is assigned to the first communication network 1. The first communication network 1 comprises a media plane 100 with one communication channel 103 to which the gateway 101 is linked, and a control plane 200 (not shown), with at least one signaling channel 203 (not shown) to which the IMS 201 is linked. The IMS 201 is adapted to controlling the gateway 101.

By which reason and way the gateway 101 is or can be controlled will now be described by use of an example referring to FIG. 2.

As mentioned above, participant B is located to a vehicle comprising a communication device 50 and a SIM 51. The SIM 51 is provided by the OEM 110. By the use of the communication device 50 and the SIM 51 a communication to the OEM 110 can be established and participant B has access to a portal A' run by the OEM 110, where several services and/or functionalities as basic services and/or functionalities are available and selectable for participant B.

Examples for basic functionalities are eCall, a digital version of the vehicle manual or a map of the vehicle manufactures agencies. For example, it is possible, that the vehicle manual is stored in/on the communication device 50 within the vehicle.

If the vehicle manual is updated, maybe because mistakes are corrected, the manual can be updated by establishing a communication connection to a communication network using the SIM 51 and then downloading the required information. This connection can be established automatically, upon request or after a confirmation. It is also possible that the establishment of such connection is scheduled by the OEM 110.

These basic functionalities A can generally be available for participant B. This means, that these functionalities can be made available by the OEM 110 which can be the manufacturer of the vehicle. Therefore the OEM 110 can have a contract with the MNO 210 because the basic functionalities A can cause data traffic in the communication network of the MNO 210 and the occurring costs are covered by the OEM 110. By this contract the amount and/or type of data which can be transferred or transmitted via the network of the MNO 210 from the participant B to the OEM 110 is arranged and the gateway 101 though which the data is transferred or transmitted is adjusted and/or controlled accordingly.

Beside this basic information or functionalities A the OEM 110 maybe wants to offer participant B the possibility to select or to order additional and/or optional services, applications or information C and/or Z.

The OEM 110 can provide additional and/or optional services, applications or information C and/or Z to the participant B. These additional and/or optional information, services or applications C and/or Z—in the following just called optional services C and/or Z—can be for example a navigation service C or full internet access Z.

If participant B decides to order optional services C and/or Z, which causes additional costs for participant B, because the additional data traffic is not covered by the agreement between the OEM 110 and the MNO 210, a control or adjustment of the gateway 101 is required in such order that in addition to the basic services the optional services C and/or Z are available for participant B.

If participant B is interested in such additional services C and/or Z, participant B could select service C on the communication device 50 or via his communication device 50 at portal A' for example.

For making the optional service C available to participant B, the gateway 101 has to be controlled, which is done or performed by the MNO 210. For controlling or adjusting the gateway 101, the MNO 210 has to know about the optional services C and/or Z selected by participant B.

If participant B for example has selected the optional service C, this information is sent to the OEM 110, which usually wants to sell optional service C to participant B. By this procedure, the OEM 110 is informed who has selected which service. This can be interesting for the OEM 110 for several reasons. Knowing how often the optional service C is ordered or selected, the OEM 110 can see how interesting optional service C is, can be one reason.

After the OEM 110 is informed about the selection and/or order of participant B, this order is forwarded and/or transferred and/or transmitted as a request for controlling the gateway to the MNO 210. This request procedure is indicated by arrow 302 in FIG. 2. Optionally it is possible that the order and/or selection is forwarded to the MNO 210 and the MNO 210 generate and/or creates a request for controlling the gateway.

In addition, the request for controlling the gateway, which can also mean that the extent of the communication flow for the communication device 50 is controlled, can also be generated by the external third party 110, and not only by the communication device 50. This may be the case for promotional and external offers.

The request for controlling the gateway or the order of participant B about optional service C is received by receiver device 225 of the M2M 211. If the order of participant B is received by the receiver device 225, the receiver device 225 can generate a request for controlling the gateway according to the order for controlling the gateway. The request for controlling the gateway is called in the following just request.

After the request is received or generated by the receiver device 225, the request can be verified by the verification device 226. Therefore the request can be compared with data, which are stored in the MNO policy and business framework 212. This procedure is shown by arrow 303 in FIG. 2. By verifying the request in the verification device 226 a comparison can be performed by checking if this request is already covered by the contract or arrangement between the OEM 110 and the MNO 210. If the request is covered by the contract or arrangement between the OEM 110 and the MNO 210 it could be possible that the request is not connected with additional costs.

After the verification of the request, the influence device 227 influences the IMS 201 according to the request. This can be performed in a way, that the IMS 201 records commands for controlling the gateway into the HSS 215 and/or the PDF 216 via an influencing procedure 301.

In the following, the gateway 101 is controlled according to the influenced IMS 201, especially by the commands recorded in the HSS 215 and/or the PDF 216 by the influence device 227.

After controlling the gateway 101 the optional services, selected and/or ordered by participant B are available for participant B. This means, that participant B can use these optional services. If participant B selected and/or ordered optional services C, which can be a navigational service for example and/or optional service Z, which can be full internet access for example, participant B can use these optional services C and/or Z after the gateway is controlled accordingly. It is clear that the optional services C and/or Z are useable in addition to the basic functionalities A, provided by the portal A' of the OEM 110.

Because optional services C and/or Z cause data traffic in the communication network provided by the MNO 210 which are connected with additional costs, the MNO 210 generates inside the IMS 201 information concerning the gateway control for a billing process 214. The billing process 214 can be performed by use of a billing engine 213 for generating billing information. The costs of the optional services C and/or Z can be paid by the participant B and/or by the OEM 110, depending on the contract or arrangement between the OEM 110 and the MNO 210.

It could be possible that the OEM 110 offers the same optional services C and/or Z to different types of vehicle model, maybe a high class module and a low-budget model. If participant B is located to the high-class model it could be possible that optional service C and/or Z is included and participant B does not have to pay for the optional service because the OEM pays for the additional data traffic transmitted through the gateway 101. For a low-budget model, the optional service C and/or Z can be connected with additional costs for participant B because this option is not covered by the OEM 110.

By the present invention, the OEM 110 which can be for example a vehicle manufacturer, can offer additional and/or optional services and/or applications C and/or Z being selectable for participant B via a portal A. To make these additional and/or optional services and/or applications C and/or Z usable for participant B, the gateway 101 inside the communication network, provided by the MNO 210, has to be adjusted and/or controlled and/or modified in a way, that the required information related to the selected optional services C and/or Z can be transmitted or transferred through the gateway to participant B. The control of the gateway 101 is performed in a way, that according to the order about optional services of participant B, which is transmitted to the OEM 110, a request for controlling the gateway 101 is transmitted to the MNO 210 and the gateway 101 is controlled according to this request.

LIST OF REFERENCE NUMERALS

1 Communication network
2 Communication network

10 Participant
11 Participant
50 Communication device
51 Subscriber Identity Module (SIM)
100 Media plane
101 Gateway GPRS Support Node (GGSN)
102 Serving GPRS Support Node (SGSN)
103 Communication channel
109 Subscription
110 Original Equipment Manufacturer (OEM)
111 Original Equipment Manufacturer (OEM) service centre or $3^{rd}$ party
140 Packet Data Protocol (PDP)
200 Control plane
201 Control device/IP Multimedia Subsystem (IMS)
203 Signalling channel
210 Mobile Network Operator (MNO)
211 Machine-to-Machine platform (M2M)
212 MNO policy and business framework
213 Billing Engine
214 Billing process
215 Home Subscriber Server (HSS)
216 Policy Decision Function (PDF)
217 Service Control Function (IN context) or Service Capability Feature (VHE/OSA context) (CSF)
218 Application Server (AS)
219 Interrogating Call Server Control Function (I-CSF)
220 Serving Call Server Control Function (S-CSCF)
221 Proxy Call Server Control Function (P-CSCF)
222 Policy Enforcement Function (PEF) or Policy Enforcement Point (PEP)
223 Other IMS networks
225 Receiver device
226 Verification device
227 Influence device
230 Service Based Local Policy SBLP, $G_0$
231 $G_1$
232 $I_{CS}$
240 Packet Data Protocol (PDP)
300 Controlling procedure
301 Influencing procedure
302 Request procedure
303 Verification procedure
A Basic functionalities, basic information,
A' Portal
B Participant
C Optional service: Navigation service
Z Optional service: Internet access

The invention claimed is:

1. A method of controlling a gateway regarding a communication flow being or to be processed through said gateway, said gateway being assigned to a first communication network, which is a mobile radio network, wherein the first communication network comprises a media plane with at least one communication channel to which the gateway is linked, and a control plane, with at least one signaling channel to which a control device, which is an IP Multimedia Subsystem (IMS), is linked, wherein said control device cannot be accessed from outside the first communication network, said control device being adapted to controlling the gateway, said method being characterized by the following steps:

inside a receiver device which is assigned to the first communication network a request for controlling the gateway is received, said request being received from an external third party device, which is not located in or directly linked to the first communication network, by use of an influence device which is assigned to the first communication network, the control device is influenced according to the request, the influenced control device controls the gateway regarding the communication flow being or to be processed through said gateway.

2. The method according to claim 1, characterized in that the gateway comprises an interface to at least one communication device, being particularly assigned to the first communication network, and that via the control of the gateway the communication flow of the communication device being or to be processed through said gateway is controlled.

3. The method according to claim 2, characterized in that an extent of communication flow for the communication device communicating through said gateway is controlled.

4. The method according to claim 1, characterized in that the receiver device and the influence device are parts of a machine-to-machine (M2M) platform assigned to the first communication network, that inside the M2M platform, the request for controlling the gateway is received, and that by use of the M2M platform the control device is influenced according to the request.

5. The method according to claim 1, characterized in that a verification device is assigned to the first communication network, that the verification device verifies the request of the external third party device for controlling the gateway which has been received by the receiver device and that the control device is influenced by use of the influence device after a positive verification of the request.

6. The method according to claim 1, characterized in that the control device in form of the IMS is influenced by recording commands for controlling the gateway into a Home Subscriber Server (HSS) and/or a Policy Decision Function (PDF) being assigned to the IMS.

7. The method according to claim 1, characterized in that information concerning the gateway control is made available for a billing process or a billing engine for generating billing information, said billing process or billing engine being assigned to the first communication network.

8. A system for controlling a gateway regarding the communication flow being or to be processed through said gateway, said system comprising the gateway being linked to a communication channel of a media plane of a first communication network, which is a mobile radio network, said system further comprising a control device, which is an IP Multimedia Subsystem (IMS), wherein said control device cannot be accessed from outside the first communication network, said control device being adapted to controlling the gateway and said control device being linked to a signaling channel of a control plane of the first communication network, said system further comprising a receiver device for receiving a request from an external third party device, which is not located in or directly linked to the first communication network, for controlling the gateway, an influence device for influencing the control device according to the request, said influence device being assigned to the first communication network, the influenced control device controlling the gateway regarding the communication flow being or to be processed through said gateway.

9. The system according to claim 8, characterized in that the gateway comprises an interface to at least one communication device, being assigned to the first communication network.

10. The system according to claim 8, characterized in that the receiver device and the influence device are parts of a machine-to-machine (M2M) platform assigned to the first communication network.

11. The system according to claim 8, characterized in that the system comprises a verification device for verifying the request for controlling the gateway which has been received by the receiver device, said verification device being assigned to the first communication network and/or that the system comprises a billing engine for generating billing information, said billing engine being assigned to the first communication network.

12. A system for controlling a gateway regarding the communication flow being or to be processed through said gateway, said system comprising a gateway being linked to a communication channel of a media plane of the first communication network, which is a mobile radio network, said system further comprising a control device, which is an IP Multimedia Subsystem (IMS), wherein said control device cannot be accessed from outside the first communication network, said control device being adapted to controlling the gateway and said control device being linked to a signaling channel of a control plane of the first communication network, said system further comprising a receiver device for receiving a request from an external third party device, which is not located in or directly linked to the first communication network, for controlling the gateway, an influence device for influencing the control device according to the request, said influence device being assigned to the first communication network, the influenced control device controlling the gateway regarding the communication flow being or to be processed through said gateway.

13. A method of controlling the extent and nature of communication of a communication device through the gateway by controlling and parametrizing the gateway, said gateway being assigned to the first communication network, which is the mobile radio network, wherein the first communication network comprises the media plane with the at least one communication channel to which the gateway is linked, and the control plane, with the at least one signaling channel to which the control device, which is the IP Multimedia Subsystem (IMS), is linked, wherein said control device cannot be accessed from outside the first communication network, said control device being adapted to controlling the gateway, said method being characterized by the following steps:

the communication flow from said communication device to the external third party device, which is not located in or directly linked to the first communication network, is established through said gateway, the request for controlling the extent of the communication flow for said communication device is generated by said communication device and/or said external third party device, the request is transmitted from the external third party device to receiver device which is assigned to the first communication network, the control of the gateway regarding the communication flow being or to be processed through said gateway is performed by a method according to claim 1, based on the controlled gateway, the communication device is enabled to communicate through said gateway according to the requested extent of communication flow.

14. The method according to claim 13, characterized in that for the communication device various services and/or applications are or can be selected and/or subscribed and based on the selection and/or subscription, the request for controlling the extent of the communication flow for said communication device is generated.

15. The method according to claim 14, characterized in that based on the controlled gateway, the communication device is enabled to use the selected and/or subscribed services and/or applications.

* * * * *